(12) United States Patent
Sato et al.

(10) Patent No.: US 10,173,138 B2
(45) Date of Patent: Jan. 8, 2019

(54) STORAGE MEDIUM, INFORMATION PROCESSING APPARATUS AND CONTROL METHOD FOR DECIDING OBJECT TYPES AND APPEARANCES BASED ON HARDWARE RESOURCE USAGE AMOUNTS

(71) Applicant: SQUARE ENIX CO., LTD., Tokyo (JP)

(72) Inventors: Masanori Sato, Tokyo (JP); Atsushi Tawara, Tokyo (JP); Toshiaki Watanabe, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 39 days.

(21) Appl. No.: 15/063,837

(22) Filed: Mar. 8, 2016

(65) Prior Publication Data

US 2016/0275643 A1 Sep. 22, 2016

(30) Foreign Application Priority Data

Mar. 16, 2015 (JP) ................. 2015-052749

(51) Int. Cl.
*G06T 1/60* (2006.01)
*A63F 13/57* (2014.01)
(Continued)

(52) U.S. Cl.
CPC ............ *A63F 13/57* (2014.09); *A63F 13/803* (2014.09); *G06T 15/005* (2013.01); *G06T 15/04* (2013.01);
(Continued)

(58) Field of Classification Search
None
See application file for complete search history.

(56) References Cited

U.S. PATENT DOCUMENTS

2004/0263512 A1* 12/2004 Santodomingo ........ G06T 15/00
345/428
2006/0221076 A1 10/2006 Takahashi et al.
(Continued)

FOREIGN PATENT DOCUMENTS

JP 2001-167291 6/2001
JP 2006-209238 8/2006
(Continued)

OTHER PUBLICATIONS

Office Action from Japan Patent Office (JPO) in Japanese Patent Appl. No. 2015-052749, dated Oct. 19, 2018.

*Primary Examiner* — Yu Chen
(74) *Attorney, Agent, or Firm* — Greenblum & Bernstein, P.L.C.

(57) ABSTRACT

A computer is caused to execute processing that that determines, based on a first usage amount of a hardware resource which is allocated for processing corresponding to objects of a first category including an essential object located in a target scene, a second usage amount of the hardware resource that is able to be allocated for processing for objects of a second category different to the first category. Also, the computer is caused to execute processing of deciding, for objects of the second category which are located in the target scene, types of those objects and an outer appearance parameter for each type based on the second usage amount and information for deciding outer appearances for when the objects of the second category are located in the target scene.

19 Claims, 5 Drawing Sheets

(51) Int. Cl.
*A63F 13/803* (2014.01)
*G06T 15/00* (2011.01)
*G06T 15/04* (2011.01)
*G06T 19/20* (2011.01)

(52) U.S. Cl.
CPC ...... *G06T 19/20* (2013.01); *G06T 2219/2012* (2013.01)

(56) References Cited

U.S. PATENT DOCUMENTS

| | | | |
|---|---|---|---|
| 2007/0132752 A1* | 6/2007 | Stacy | A63F 13/12 345/418 |
| 2009/0021512 A1 | 1/2009 | Nagayama | |
| 2011/0055267 A1* | 3/2011 | Bolger | A63F 13/12 707/780 |

FOREIGN PATENT DOCUMENTS

| | | |
|---|---|---|
| JP | 2006-285509 | 10/2006 |
| JP | 2012-213485 | 11/2012 |

* cited by examiner

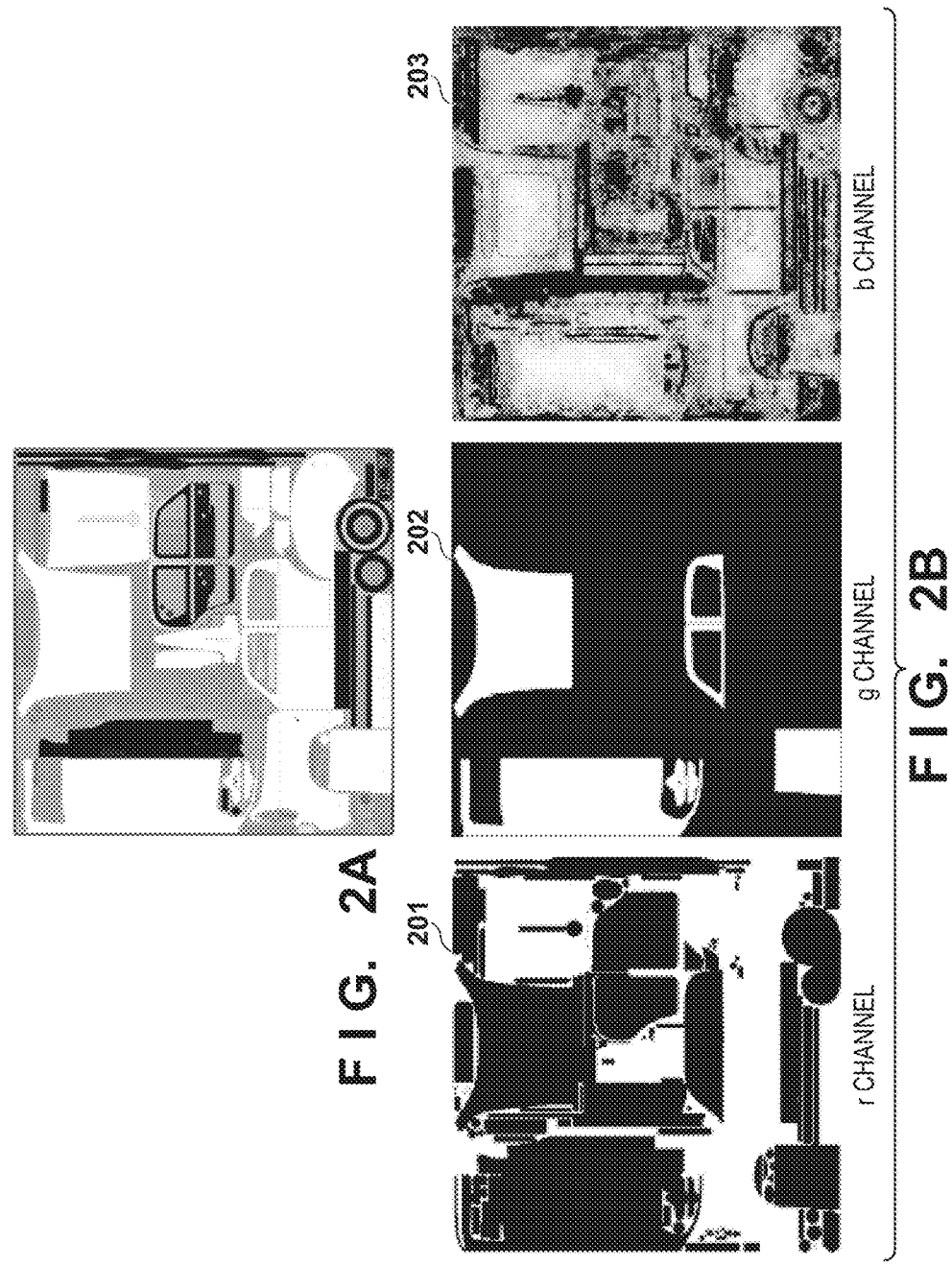

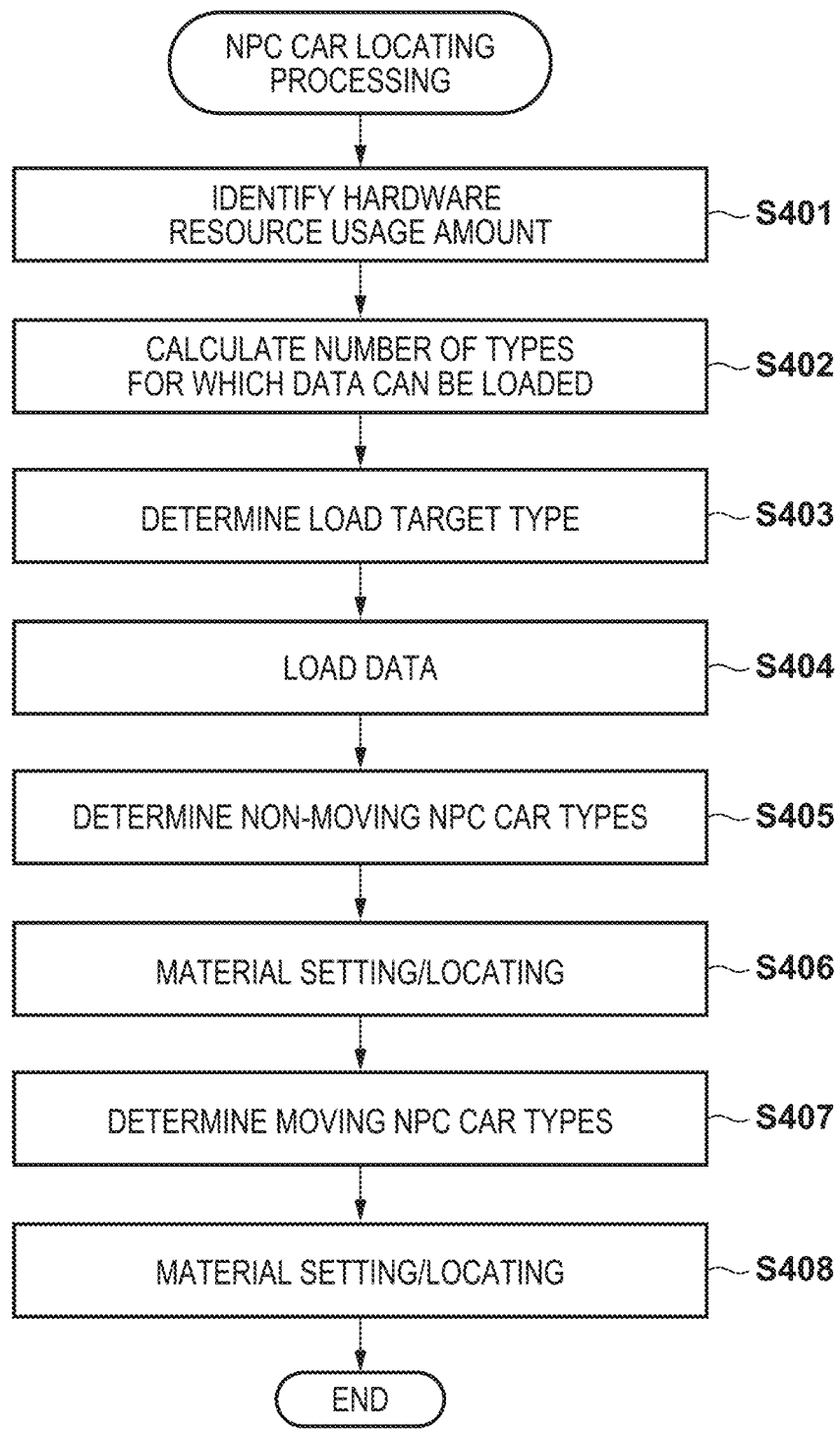

FIG. 5

| AREA | TYPE | WEATHER | TIME PERIOD | MATERIAL VALUE RANGE | | | |
|---|---|---|---|---|---|---|---|
| | | | | REFERENCE COLOR | RUST | FADED COLOR | PAINT PEELING |
| AREA A | TYPE A | SUNNY | 10:00~18:00 | R:00~2F<br>G:00~FF<br>B:00~3D | 00~1E | 00~00 | 00~4F |
| | | CLOUDY | — | | | | |
| | | RAINY | 10:00~18:00 | | | | |
| | TYPE B | SUNNY | 12:00~14:00 | R:40~5E<br>G:30~FD<br>B:00~FF | 00~00 | 20~3F | 00~1E |
| | | CLOUDY | 0:00~13:00 | | | | |
| | | RAINY | 7:00~19:00 | | | | |
| | TYPE C | SUNNY | — | R:20~2F<br>G:90~AF<br>B:40~DF | 20~3F | 00~0F | 00~00 |
| | | CLOUDY | 10:00~18:00 | | | | |
| | | RAINY | 22:00~4:00 | | | | |
| | TYPE D | SUNNY | 15:00~23:00 | R:00~EF<br>G:00~3F<br>B:00~FD | 00~00 | 50~AF | 00~2F |
| | | CLOUDY | 22:00~4:00 | | | | |
| | | RAINY | — | | | | |
| | TYPE E | SUNNY | 22:00~4:00 | R:00~1F<br>G:40~AF<br>B:F0~FF | 00~0F | 00~00 | 00~88 |
| | | CLOUDY | 0:00~13:00 | | | | |
| | | RAINY | — | | | | |
| | TYPE F | SUNNY | — | R:00~FF<br>G:00~FF<br>B:00~FF | 00~FF | 00~2F | 00~BF |
| | | CLOUDY | 0:00~13:00 | | | | |
| | | RAINY | — | | | | |
| | TYPE G | SUNNY | 7:00~19:00 | R:20~2F<br>G:90~AF<br>B:40~DF | 00~4F | 00~BF | 00~FF |
| | | CLOUDY | 7:00~19:00 | | | | |
| | | RAINY | 7:00~19:00 | | | | |
| | TYPE H | SUNNY | 0:00~13:00 | R:00~FF<br>G:00~FF<br>B:00~FF | 00~FF | 00~3F | 00~1E |
| | | CLOUDY | 7:00~19:00 | | | | |
| | | RAINY | 22:00~4:00 | | | | |
| AREA B | TYPE A | SUNNY | 10:00~18:00 | R:00~FF<br>G:00~FF<br>B:00~FF | 00~2F | 00~00 | 00~4F |
| | | CLOUDY | 12:00~14:00 | | | | |
| | | RAINY | 0:00~13:00 | | | | |
| | TYPE B | SUNNY | 22:00~4:00 | R:20~2F<br>G:90~AF<br>B:40~DF | 00~00 | 20~3F | 00~1E |
| | | CLOUDY | 15:00~23:00 | | | | |
| | | RAINY | 22:00~4:00 | | | | |
| | TYPE C | SUNNY | 0:00~13:00 | R:00~FF<br>G:00~FF<br>B:00~FF | 00~2F | 00~BF | 00~FF |
| | | CLOUDY | 7:00~19:00 | | | | |
| | | RAINY | 22:00~4:00 | | | | |
| | TYPE D | SUNNY | — | — | — | — | — |
| | | CLOUDY | — | | | | |
| | | RAINY | — | | | | |
| | TYPE E | SUNNY | 12:00~14:00 | R:00~FF<br>G:00~FF<br>B:00~FF | 00~0F | 00~00 | 00~88 |
| | | CLOUDY | 0:00~13:00 | | | | |
| | | RAINY | 22:00~4:00 | | | | |
| | TYPE F | SUNNY | — | R:00~FF<br>G:00~FF<br>B:00~FF | 00~2F | 00~2F | 50~AF |
| | | CLOUDY | 0:00~13:00 | | | | |
| | | RAINY | — | | | | |
| | TYPE G | SUNNY | 7:00~19:00 | R:20~2F<br>G:90~AF<br>B:40~DF | 00~4F | 00~BF | 00~FF |
| | | CLOUDY | 22:00~4:00 | | | | |
| | | RAINY | 15:00~23:00 | | | | |
| | TYPE H | SUNNY | 0:00~13:00 | R:00~FF<br>G:00~FF<br>B:00~FF | 00~FF | 00~3F | 00~2F |
| | | CLOUDY | 7:00~19:00 | | | | |
| | | RAINY | 22:00~4:00 | | | | |

STORAGE MEDIUM, INFORMATION PROCESSING APPARATUS AND CONTROL METHOD FOR DECIDING OBJECT TYPES AND APPEARANCES BASED ON HARDWARE RESOURCE USAGE AMOUNTS

BACKGROUND OF THE INVENTION

Field of the Invention

The present invention relates to a storage medium, an information processing apparatus and a control method, and particularly to a technique of generating an object under a hardware restriction.

Description of the Related Art

In recent years, in conjunction with an improvement in computational capabilities of processors such as CPUs and GPUs, a rendering expression that is close to the real world has become possible in the field of computer graphics, and techniques by which it is possible to provide an experience that gives a sense of reality and causes an observer to become more immersed have been proposed. In particular, in the field of computerized games, the so-called open world game format, in which seamless movement in a vast, realistically expressed virtual world can be provided to a player, has achieved a certain assessment from the perspective of degrees of freedom of manipulation (Japanese Patent Laid-Open No. 2012-213485).

Reality presentation in an open world game, as in Japanese Patent Laid-Open No. 2012-213485, is provided not just by beautiful graphics based on a faithful rendering reproduction of the real world (illumination computations or the like), but also by, for example, reproducing a state in which a character, a movable gimmick object (props), or the like dynamically changes in accordance with the situation. In particular in recent years it is possible to cause a player to perceive a higher sense of reality by performing various computations based on a so-called physical simulation that reproduces behavior in accordance with the laws of nature. By implementing so-called artificial intelligence or the like by which a character performs decision-making in accordance with predetermined information, based on variable information that indicates a current state or information embedded in a located field, it is possible to cause a player to recognize the character as an individual that has an individuality.

In contrast, because an implementation for improving such a sense of reality typically consumes many computation resources and memory resources, even if the scale of computational capabilities or memory for a player's game console, PC, or the like improves, there were concerns, for example, that a memory capacity used in holding or loading of corresponding data would be pressed, that an amount of computation that should be caused to terminate within a frame interval would become huge, or the like.

In content such as a game, because provision of necessary game elements that a planner or the like should provide is prioritized, it is necessary to implement measures to improve the reality under hardware restrictions by making processes superior or inferior. However, there is the possibility of not being able to provide a suitable sense of reality by only implementing necessary game elements by performing various computation processing for objects including locating of rendering objects such as a fixed character group, for example. In other words, because reality is something provided based on accidentalness, it is important to construct a desired world-view that dynamically changes in accordance with, for example, a region, time period, the weather, or the like, and to locate and control so-called lively elements, such as objects that have individual variability.

However, a technique that suitably locates and controls lively elements in this way under hardware restrictions, that is by using limited resources that can dynamically change in accordance with required elements, has thus far not been proposed.

SUMMARY OF THE INVENTION

The present invention was made in view of such problems in the conventional technique. The present invention provides a storage medium, an information processing apparatus and a control method, that suitably generate and control a rendering object that presents a reality under a hardware restriction.

The present invention in its first aspect provides a non-transitory computer-readable storage medium storing a program that causes a computer, having a hardware resource used for either of computation and holding data connected to a renderer for rendering a screen in which an object is located in a scene, to execute: processing of identifying a first usage amount of the hardware resource which is allocated for processing corresponding to objects of a first category including an essential object located in a target scene; processing of determining, based on the first usage amount, a second usage amount of the hardware resource that is able to be allocated for processing for objects of a second category different to the first category; and processing of deciding, for the objects of the second category which are located in the target scene, types of those objects and an outer appearance parameter for each type based on the second usage amount and information for deciding outer appearances for when the objects of the second category are located in the target scene.

The present invention in its second aspect provides an information processing apparatus having a hardware resource used for either of computation and holding data connected to a renderer for rendering a screen in which an object is located in a scene, the apparatus comprising: an identifier which is able to identify a first usage amount of the hardware resource which is allocated for processing corresponding to objects of a first category including an essential object located in a target scene; a determiner which is able to determine, based on the first usage amount identified by the identifier, a second usage amount of the hardware resource that is able to be allocated for processing for objects of a second category different to the first category; and a decider which is able to decide, for the objects of the second category which are located in the target scene, types of those objects and an outer appearance parameter for each type based on the second usage amount determined by the determiner and information for deciding outer appearances for when the objects of the second category are located in the target scene.

The present invention in its third aspect provides a method of controlling an information processing apparatus having a hardware resource used for either of computation and holding data connected to a renderer for rendering a screen in which an object is located in a scene, the method comprising: a step of identifying a first usage amount of the hardware resource which is allocated for processing corresponding to objects of a first category including an essential object located in a target scene; a step of determining, based on the first usage amount, a second usage amount of the hardware resource that is able to be allocated for processing for objects of a second category different to the first category; and a step of deciding, for the objects of the second category which are located in the target scene, types of those objects and an outer appearance parameter for each type based on the second usage amount and information for deciding outer appearances for when the objects of the second category are located in the target scene.

Further features of the present invention will become apparent from the following description of exemplary embodiments (with reference to the attached drawings).

BRIEF DESCRIPTION OF THE DRAWINGS

FIGS. 2A and 2B are views for explaining data according to embodiments of the present invention for causing the outer appearance of an NPC car to differ.

FIG. 4 is a flowchart for exemplifying processing for locating an NPC car executed in the game console 100 according to an embodiment of the present invention.

FIG. 5 is a view for showing an example of information according to an embodiment of the present invention for locating NPC cars.

DESCRIPTION OF THE EMBODIMENTS

Figure 1:
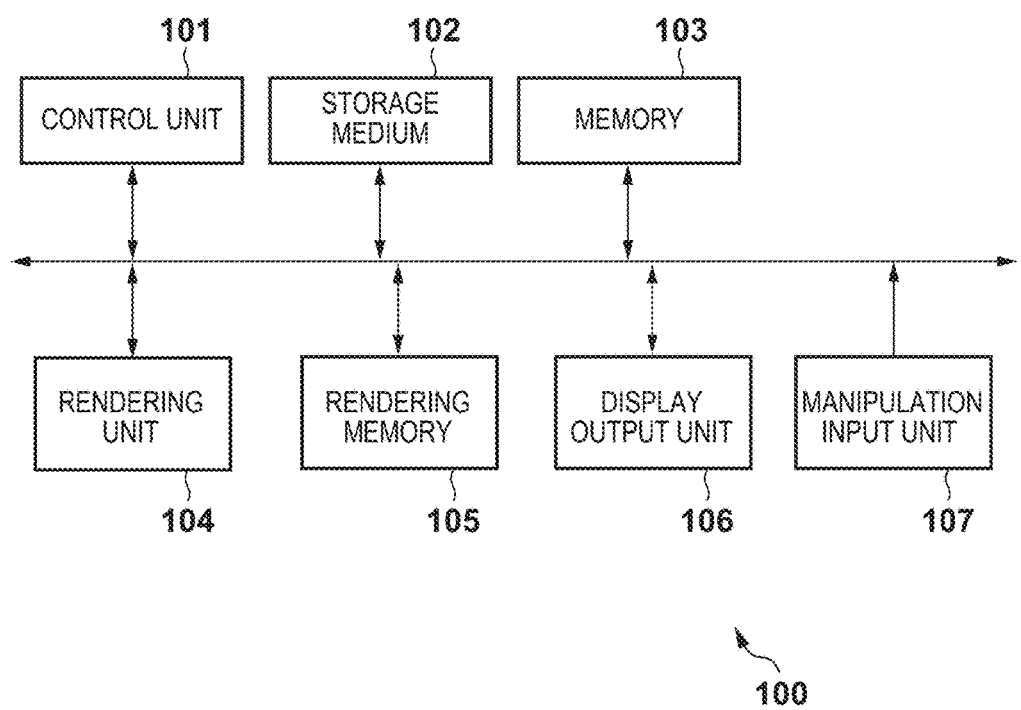
FIG. 1 is a block diagram for illustrating a functional configuration of a game console 100 according to an embodiment of the present invention.
Figure 3A:
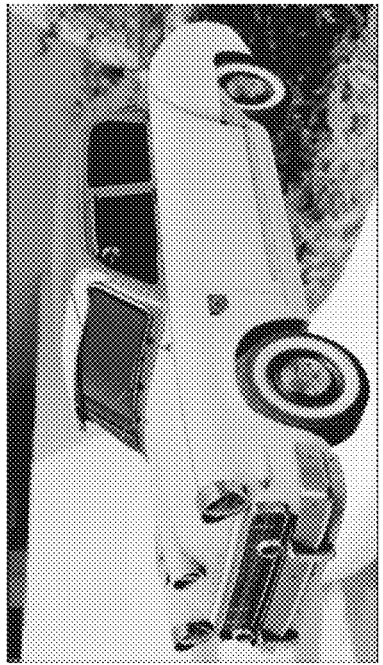
FIGS. 3A, 3B, 3C and 3D are views for illustrating an NPC car having a different outer appearance generated by a rendering program determined for one piece of model data according to an embodiment of the present invention.
Figure 3B:
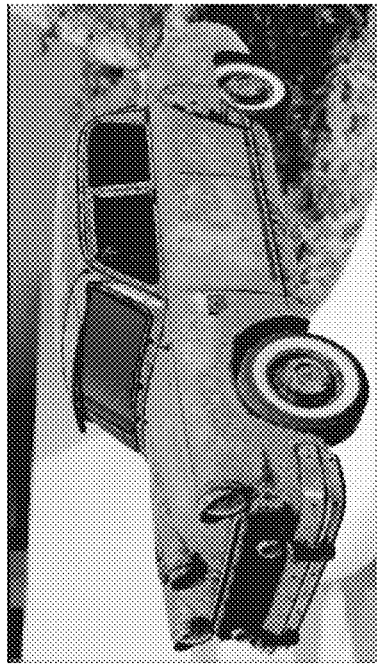
Figure 3C:
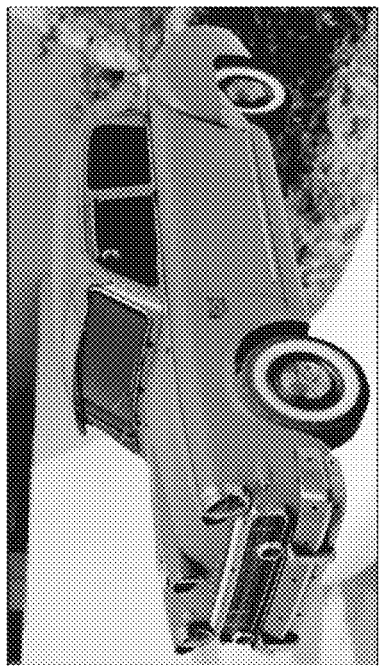
Figure 3D:
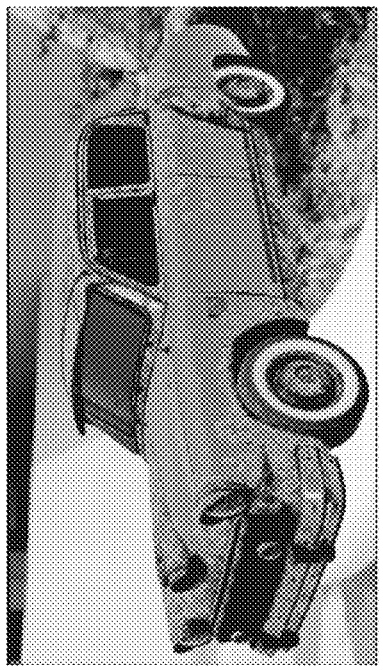

Exemplary embodiments of the present invention will be described hereinafter in detail, with reference to the accompanying drawings. Note, in the embodiment described below, explanation is given for an example where the present invention is applied to a game console comprising a rendering unit for rendering a screen where a rendering object is located in a scene according to game content as an example of an information processing apparatus. However, the present invention is not limited to a device that integrally comprises an apparatus having a screen rendering function in which the rendering objects are located in a scene, and can also be applied to any device, to which the device having the function is directly or indirectly connected, that has a hardware resource that is used for either computation or data retention.

In addition, in the present specification, the term "PC" refers to a Player Character on which an operation control is directly performed in accordance with manipulation performed by a player with respect to a manipulation input interface; the term "NPC" differs from a PC and refers to a Non-Player Character on which operation control either is performed, but not based on manipulation performed by a player, or is performed indirectly in accordance with manipulation performed by a player. Also, a computation such as of a position or an orientation determination in accordance with behavior corresponding to an environment change or a dynamic change due to a physical simulation is performed as necessary for an object on which control of behavior is performed, such as a character object such as a PC or an NPC, a later described automobile object, or a background (BG) object like a plant, for which an operation is induced by wind, rain, or a movement of PC; in the following explanation, these are simply called "physical computations" as a whole. In addition, for simplicity in the present embodiment, explanation is given below such that a "physical computation" also includes, in addition to computations for behavior, computations for obtaining a result based on a simulation, such as a computation corresponding to a shading or a luminance change due to a direct light source and an indirect light source produced by an existence of a light source, a computation corresponding to reproduction of glare produced by a reflection of mirror surface, a puddle, or the like, and a computation corresponding to rendering of Visual Effects (VFX) due to weather or a particular skill of a character.

Also, although detail will be explained later, in a provision of game content, especially that for which information is updated every frame, there is processing, such as data loading of a required rendering object and computations on a corresponding object, which should be executed upon the provision by preferentially allocating a hardware resource such as a CPU or a memory. In other words, for a rendering object such as an above-described so-called lively element, it is necessary to perform using a surplus resource after the preferential allocation is performed. According to this embodiment, a car object is given as an example of a rendering object for which data loading or processing should be performed using a surplus resource in this way, and it is explained as an "NPC car" hereinafter. Note that it should be easily understood that the rendering objects to which surplus resources are allocated and for which processing for rendering is performed are not limited to car objects, and that another type of object, or in some cases an NPC, may be included.

Note, an essential rendering object is an element which can vary during game play by a player in accordance with a position of a PC which is a target of manipulation the player, or a position of a viewpoint for a screen rendering. In the present embodiment, this is assumed to be a PC that is normally captured in a screen provided in the process of playing game content, and objects corresponding to physical objects such as a PC, an ally character made to act alongside as an "ally" of a PC in the game, a sub-character such as a person involved in a specific event or a shop owner in the game, or a building predetermined to be located in a specific position in a world of the game content, which are physical objects that are viewable from a world position at which a PC is present, are treated as essential rendering objects in accordance with a progress condition of the game, and hereinafter simply referred to as "essential objects".

<Configuration of Game Console 100>

FIG. 1 is a block diagram for showing a functional configuration of a game console 100 according to embodiments of the present invention.

A control unit 101 is for example a CPU or the like, and performs processing corresponding game content that is provided as well as control of operation of each block that the game console 100 has. The control unit 101 performs an operation corresponding to operation control of each block or a provision of game content by reading out an operation program or a game program of each block, for example recorded in a storage medium 102, loading it to a memory 103 and executing it.

The storage medium 102 is a recording apparatus, for example a non-volatile ROM integrated in the game console 100, an HDD detachably connected to the game console 100, a recording medium that can be read when inserted into an optical drive, or the like. The storage medium 102 records not only the operation program and the game program of each block that the game console 100 has, but also various parameters, data of a rendering object, or the like, required for an operation of each block. Rendering object data has model data, texture data, a rendering program such as a shader in association with an object ID which is identification information for identifying an object uniquely for example.

The memory 103 is, for example, a volatile memory. The memory 103 is used not only for loading of an operation program or a game program of each block, but also for a storage region for temporarily storing intermediate data outputted in an operation of each block and various information defined in an execution of a game program. For convenience of explanation of the present invention, in the present embodiment, explanation is given clearly distinguishing a later described rendering memory 105 and the memory 103 from their characteristics.

A rendering unit 104 is a rendering apparatus, for example a GPU for performing various computations corresponding to rendering and game screen generation for presenting to an external display apparatus as a final output. The rendering unit 104 reads out and loads the required rendering object data into the rendering memory 105 which may be for example, a GPU memory, performs rendering applying required computations, and generates a game screen for every frame.

A display output unit 106 is a display output interface that the game console 100 has, and can output game screens generated by the rendering unit 104 to a connected display apparatus (not shown) at a predetermined timing, and perform a provision of game content to a player. A display apparatus existing as an external unit of the game console 100 may be connected to the game console 100 by wire or wirelessly, and may be installed integrally inside a housing of the game console 100.

A manipulation input unit 107 is a user interface which the game console 100 has such as a game pad, a keyboard, a mouse, or the like, for example. The manipulation input unit 107 analyzes a manipulation input from the player received by these various user interfaces, and transmits a corresponding control signal to the control unit 101. Alternatively, the manipulation input unit 107 notifies an occurrence of an event corresponding to the analyzed manipulation input to the control unit 101.

<Overview of Processing for NPC Cars Corresponding to Reality Presentation>

For a presentation of a suitable reality, it is necessary to consider the locating of a rendering object that has behavior or individual variability according to a dynamic element as described above, or a tendency of the rendering object for which a world-view is considered. Below, first, an explanation is given for an overview of processing for NPC cars corresponding to a reality presentation under a restriction of a hardware resource for game content that is provided by the game console 100 according to the present embodiment.

<Restriction Due to Hardware Resource>

Firstly, a restriction caused by a hardware resource is explained. In game content provided by the game console 100 of the present embodiment, a player can move a PC in a vast field of an open world by manipulating it. As described above, essential objects change in accordance with a progress condition of the game that changes in conjunction with such movement, but it is necessary that various data for rendering determined for essential objects be stored in the rendering memory 105 for each situation. Also, in addition to the essential objects as described above, a rendering object of an enemy character, which is a battle opponent of the PC, and a rendering object caused to belong to an essential object such as a piece of equipment or a vehicle that the PC or an ally character attaches or rides, or the like, are things for which an existence or absence of rendering is controlled in accordance with a progress condition of a game or a scenario, and the existence or absence of rendering, unlike NPC cars, cannot be switched regardless of the progress condition. That is, other than the predetermined essential objects, for an object (priority object) which requires a preferential location suitable to a situation as a game element, it is necessary to store in the rendering memory 105 various data for rendering that has been determined for the object. In other words, because a load area for data that is required for rendering of essential objects and priority objects is necessary in the rendering memory 105, inevitably a restriction that depends on surplus resources of the rendering memory 105 occurs when rendering NPC cars.

Also, from a memory perspective, for example resources of the memory 103 are spent in order to manage information required for control of an NPC such as decision-making for each area where a PC exists and information indicating a condition of the NPC. For the reality presentation, while it may shift in accordance with the world-view, it is necessary to manage to be able to cause a wide variety of NPCs, whose number corresponds to an area and who have different gender or clothing, to appear in order not to give the player a feeling of constant underpopulation. Also, for these NPCs, it is necessary independently manage a state such as that of a position or an action in order not to cause an unrealistic situation to occur, such as when more than one of the same NPC exists within a short distance, or when the same NPC invariably exists wherever one goes even if one moves to a different position such as a town. It is necessary to similarly manage a state, such as that of a position or a behavior, for NPC cars so not to cause an unrealistic situation to arise, but a possibility that it is determined that it should be rendered necessarily is lower than with an NPC; that is, for example, the necessity of giving up on the locating of an essential NPC to locate an NPC car is low, and therefore resources of the memory 103 are preferentially allocated to store data for managing NPCs. Therefore, a region for storing data required for rendering and managing NPC cars inevitably has a restriction that depends on surplus resources of the memory 103.

Additionally, for implementation of a physical simulation, the control unit 101 or the rendering unit 104 handles a predetermined physical computation within the range of each computation resource. That is, it is necessary for the control unit 101 or the rendering unit 104 to perform processing for a physical computation for, for example, an essential object for a reality presentation, and therefore rendering of an NPC car, a movement calculation, and (if needed) a physical computation are inevitably restricted by surplus resources of computation resources.

In this way, for processing for NPC cars for which the necessity for rendering is assigned to be low, the processing needs to be executed under the restriction of a hardware resource of the game console 100 such that reality is not caused to be broken.

<Behavior of Rendering Objects>

Regarding behavior, typically in character objects, the behavior of a character to which a fixed role is given, such as a PC which is a target of manipulation by the player, an ally character made to act alongside as an "ally" of a PC in the game, an enemy character that is a battle opponent of a PC, a sub-character such as a person involved in a specific event or a shop owner in the game, or the like is an element that tends to be focused on by a player, and therefore it is necessary to control preferentially so that such behavior does not become unnatural in order to present a suitable reality. On the other hand, it can be said that a lively element character to which a fixed role is not given such as one that merely sits in a place, a character greatly separated from a PC, a character that does not enter into or is occluded in a rendering range of the screen, or the like, tends not to be focused on by a player even if it is a character object, for example.

Similarly, in an object that is a physical object that is not a character, such as an NPC car, it is advantageous for a reality presentation that a behavior be caused to change in accordance with the existence of an unevenness in a street or a BG object, an obstacle (a small tool, props) that is not fixed, a character object that enters into traffic lane that is being driven, or the like, for example, and dynamic behavior control that is performed having determined a situation becomes necessary. Meanwhile, if a situation is not such that it is possible for the player to grasp the situation in which an object is placed for such a dynamic behavior change, it will be impossible for him to understand the reason for that behavior, and therefore it is somewhat meaningless to perform dynamic behavior control for an object that is far from a viewpoint which is located with the PC as a reference when screen rendering. However, because it can be said that the existence of a moving body such as an NPC car, and its course as it moves further away may be focused on, even if its distance is separated from the PC, stopping its rendering for that reason could give the player an unrealistic impression such as when the physical object that he was focusing on suddenly disappears.

Accordingly, in the present embodiment, the existence or absence of dynamic behavior control of an NPC car is switched in accordance with the distance from the PC. Specifically, hardware resources are allocated preferentially for an NPC car that is not separated from the PC by a predetermined distance, as a dynamic behavior control target, and processing is performed for control based on a physical computation that considers a collision of props or a BG object such as a street. Meanwhile, an NPC car located more than the predetermined distance from the PC is removed from being the target of the dynamic behavior control. At this time, because normally control is performed so that the NPC car is maintained on the street based on repulsion due to a street collision, rather than assuming a state that does not consider a street collision (if following a physical simulation, the NPC car falls out of the street), processing is caused to be different such that a physical computation is not performed and it is caused to move following information that indicates the route of the road (information that defines a curved line of a curve in three-dimensional coordinates).

Also, so that unnatural behavior does not occur at a timing of a switch due to this kind of a switch being performed in accordance with a distance from the PC, configuration is taken such that information of a speed at which it proceeded up until the position of switching from dynamic behavior control in a case where the distance increased, for example, is inherited and transition is made to processing of movement that follows the route. Also, if conversely the distance becomes closer, control is taken to initiate a physical computation, causing the speed of the processing of movement that followed the route until the switching position to be an initial speed.

Also, while there are realistic cases in which for an NPC car a lighting state such as for headlights is set depending on the weather or a time period, because often the amount of computation for a physical computation corresponding to an expression of shading, a reflection, or the like, that occurs due to the light source, for example, becomes large, the distance between the PC and the NPC car that is made to be the target of the execution may be made to be shorter than for a physical computation for behavior. In other words, configuration may be taken such that while a computation corresponding to a light source that entered a lighting state is performed for an NPC car located at a predetermined distance from the PC, and an effect that corresponds to that light source is considered on other objects, processing that does not execute a computation for shading rendering and that limits an illumination area for an NPC car that is separated by that distance may be performed. Also, it goes without saying that this kind of physical computation switching is not limited to a light source and may be applied to an effect due to VFX, and configuration may be taken so as to arrange threshold values of distances at which to perform the switching in a stepwise fashion, or to limit the execution content at each of the steps.

<Individual Variability of Rendering Objects>

For individual variability elements, normally a dedicated model, texture, rendering program, or the like is arranged in advance for an object of a physical object that can be, as described above, an essential object, such as a character that has a fixed role, or a decoration, or vehicle or the like that is associated with the character. Also, similarly dedicated data for rendering is arranged for a building, a gimmick, or the like that is located at a particular town or point that the PC repeatedly visits in the content. It is possible to allow the player to recognize distinguishably which individual these objects for rendering are indicating by the objects being shown as the screen repeatedly.

Meanwhile, for objects for which it is not necessary to allow the player to recognize distinguishably, such as with an NPC car, and the necessity to arrange different respective dedicated models and textures is low. In particular, it is not necessarily the case that it is sufficient to cause a determined number of a rendering object such as an NPC car to appear; the number that are caused to appear should be controlled in accordance with a situation in the content and a desired expression in the content such a time period and a worldview. Even if, for example, the locating of several tens of NPC cars is necessary to express an urban area having a high amount of traffic in view of this kind of display priority placement, it is not realistic to load into the rendering memory 105 and render respectively different dedicated models and textures for all of these. In other words, because it is necessary to load into the rendering memory 105 data for rendering that is dedicated for an essential object as described above, data for rendering corresponding to several tens of NPC cars must be loaded using a surplus resource of the rendering memory 105.

In contrast to this, if the types of the NPC cars are limited, for example, data for rendering can be loaded into the surplus resources of the rendering memory 105. However, several tens of NPC cars being rendered by limited types of NPC cars cannot provide an ideal reality to the player. In other words, because it is rare in the real world for several tens of only limited types of automobiles to exist in one urban area, an unnatural impression may be given to the player. In contrast to this, it is possible to express NPC cars of different types by applying different textures to the models of NPC cars of the same type. However, for a beautiful rendering expression, typically a texture having a large number of pixels is required, but the amount of data for such a texture is large, and the number that can be loaded into the surplus resources of the rendering memory 105 is limited.

In the present embodiment, by using a rendering program such as follows for an NPC car, an arrangement for generating an NPC car that presents an individual variability that configures a plurality of types of textures forming different outer appearances from a limited number of textures or maps associated for one model is used. With this, compared to an approach of generating NPC cars of a plurality of types using the same model, it is possible to reduce an occupation ratio of the rendering memory 105 used for one type of NPC car.

Specifically, textures and a rendering program are configured to be able to cause a material expression for 3 types of portions: the body portion (a paint part and a metal part); an interior+tires+an awning part; and the glass+light emitting units (light types) to be different so as to express individual variability of NPC cars, for example, in a case where an automobile model is used as a tangible object as in the game content of the present embodiment. For example, explaining with the body portion as an example, one reference color texture for a body portion is prepared for one model of an NPC car as illustrated in FIG. 2A. With this reference color texture, a portion to which a reference color that becomes the outer appearance of the vehicle is applied is configured with white, and it is made possible to apply a color value of a reference color that is applied to that portion by a rendering program for the model by changing an instruction value. Note that the rendering program can be made to recognize the reference color region by multi-masking as illustrated in FIG. 2B. In the example of FIG. 2B, configuration is taken such that 2 types of reference colors can be selected for different regions of the body for the target NPC car model; masks 201 and 202 which indicate the parts to which each reference color is applied are held as different channels (in the example of FIG. 2B, r channel and g channel) of one image.

Also, a damage pattern 203 for expressing a distribution of damage that occurs on the body is arranged in another channel (b channel) of the multi-masking, as illustrated in FIG. 2B. With the damage pattern, by a range of pixel values being designated, it is possible to designate a pixel having a pixel value included in that range as a pixel that adds a damage expression to a reference color texture. In the game content of the present embodiment, configuration is such that a rust, a faded color, a paint peeling, and an unevenness can be added as a damage expression for the body of an NPC car. These damage expressions are implemented by applying a color texture, a color mask, a material map, a normal map, a color map or the like which are arranged for each expression with respect to a pixel having a pixel value in the designated range for each tile that the damage pattern 203 is divided into.

In this way, in the game content of the present embodiment, by executing a rendering program by designating a parameter for each type of material, it is possible to render such that a texture of a material expression corresponding to the parameter is applied when rendering model data that applies a predetermined reference color texture. With this, it is possible to generate NPC cars as in FIGS. 3A, 3B, 3C and 3D which can give the player an impression that textures that indicate different outer appearances are applied even if a plurality of textures are not loaded for each NPC car model. Accordingly, it is possible to perform NPC car rendering that does not cause reality to be ruined in limited surplus resources of the rendering memory 105.

<Other Control Based on World-View>

In addition, in game content that the game console 100 of the present embodiment provides, control for generating an NPC car based on a world-view as an element for a reality presentation is performed. The world-view is implemented by predetermining tendencies of types having high traffic frequency in a specific area in the game or in a specific time period, and tendencies of riding characters for each type (gender, number of people, personal relationship, etc.) for example. The number of cars that are located, and the type of the NPC cars that are generated may be determined in accordance with a world-view determined for a respective area so as, for example, to have tendencies for there to be many types for industry such as trucks in an industrial region, and on the other hand for there to be many small types in a town area, and for there to be a lower frequency of traffic of ordinary types in a night time period or on a rainy day, and for there to be men and women characters riding as a couple in certain types, and where only a limited number of types with a flashy design are located in an area. Also, tendencies of traffic frequency may be determined by interworking with a selected material element; in order to avoid an unnatural situation in which, for example, only new NPC cars, or only rusty NPC cars pass by, the locating of each type may be something for which material tendencies (in particular, elements outside of a reference color) are determined in accordance with an area or a time period.

In an area in which it is advantageous that many cars be located, such as a gas station, or a parking lot, for example, it is necessary to locate NPC cars by performing a physical computation that considers unevenness in terrain and the street as described above. However, while this kind of so-called lively element is necessary for a reality presentation, normally such an NPC car is stopped and it is not necessary to perform a physical computation until it enters a state in which it moves after locating. In other words, control of whether or not to set a physical computation target in accordance with the locating intent or the area in which it is located, and not only switching of the existence or absence of a physical computation in accordance with the distance from the PC as described above, should be performed. Accordingly, in the present embodiment, an NPC car for which the main purpose is made to be only locating such as a lively element, is caused to be grounded on the road by performing a physical computation upon locating so not to locate without consideration of the unevenness of the terrain; however, because a physical computation becomes unnecessary after the passage of a predetermined time period, control is performed to avoid an unnecessarily consumption of hardware resources by removal from being the target of execution of a physical computation by changing an attribute for a static object irrespective of distance from the PC.

<NPC Car Locating Processing>

Using the flowchart of FIG. 4, explanation is given of specific processing for NPC car locating processing executed in the game console 100 of the present embodiment having this kind of configuration. The processing corresponding to this flowchart can be implemented by the control unit 101 reading a corresponding processing program stored in the storage medium 102, for example, loading it into the memory 103, and executing it.

Note that this NPC car locating processing is explained as something that is executed in predetermined frame intervals, for example, is executed when a predetermined time period in the game passes, or is initiated when it is determined that a PC has moved a specific distance or into a specific area. Also, this NPC car locating processing may be processing that is performed in parallel to processing for rendering a game screen for every frame, and may be made to operate so as to generate NPC cars sequentially at a lower priority level than that of processing for rendering for essential objects and priority objects, and to locate the generated NPC cars for scene data for sequential screen rendering.

In step S401, the control unit 101 identifies a usage amount for a hardware resource that is used in various computations and rendering processing for a rendering object to be located in a target scene. That is, the control unit 101 identifies a usage amount of an allocated resource for a computation and a resource for holding data for essential objects and priority objects located in a target scene that are determined in accordance with a current position of a PC. Note that because there exist rendering objects for which it is necessary to perform data loading prior to manipulation by a player, and rendering objects that enter into an angle of view that is determined based on a viewpoint, and the like, the target scene is not limited to a region within an angle of view determined based on the viewpoint (a range that is rendered for a screen), and may be something that is determined considering a wider region.

In step S402, the control unit 101 calculates a number of types of NPC cars for which corresponding data can be loaded into the rendering memory 105. The control unit 101 identifies a surplus resource amount of the rendering memory 105 based on the usage amount of the rendering memory 105 obtained in step S401, that is a resource amount for which allocation for NPC car rendering is possible. Then, the control unit 101 obtains a number of types for which data loading is possible by dividing the resource amount for which allocation is possible, for example, by a data amount for data necessary for rendering an NPC car. For simplicity, in the present embodiment, explanation is given having the data amount for an NPC car that is necessary to render each type be the same, but realistically, the data amount will differ for each type, and therefore the number of types for which data loading is possible may be obtained based on, for example, a maximum data amount for all NPC car types, or an average data amount. Alternatively, configuration may be taken such that information of an NPC car type that is located which is determined for a current time period in the game and area in which the PC exists is obtained to obtain the number of types for which data loading is possible.

In step S403, the control unit 101 determines a type of NPC car that is located by referencing information for NPC car locating which is predetermined. Information for NPC car locating may be of a configuration as in FIG. 5, for example, and as explained in the outline of processing for NPC cars corresponding to a reality presentation, the types that pass by, and the time periods thereof are determined for each area in the game and type of weather. The control unit 101 references the information for NPC car locating, and identifies a type that can be located in the target scene by a condition of an area in which the PC currently exists, the weather of that area, and the time period. Then the control unit 101 selects, as load targets, from the types that can be located, types of NPC cars of a number that can be dataloaded into the rendering memory 105. Note that configuration may be such that if the types that can be located according to the time period are less numerous than the number of the types of NPC cars for which data loading is possible, only the types that can be located are selected as load targets.

In step S404, the control unit 101 reads data for rendering for the NPC cars of the types selected as the load targets from the storage medium 102, and loads it into the rendering memory 105.

In step S405, the control unit 101 identifies the number of non-moving NPC cars to be located in the target scene, and the locating coordinates thereof, and sequentially determines the types to be located from the load target types in accordance with information of frequency of appearance of each type which is determined for information for NPC car locating.

In step S406, the control unit 101 sets a material parameter of NPC cars of the types determined in step S405, and locates in the target scene by performing a physical computation. Specifically, the control unit 101 sets and stores in the memory 103 a value or application level for each type of material parameter which is an outer appearance parameter for an NPC car that is located in a range determined for information for NPC car locating for each material of a determined type. For a material parameter stored in this way, it is possible to render as an NPC car of an outer appearance corresponding to the set material parameter by a rendering program corresponding to the type determined based on this set value being executed by the rendering unit 104. Also, the control unit 101 performs a physical computation corresponding to terrain of world coordinates that are located when locating an NPC car of the determined type in the target scene. The rendering unit 104 locates the NPC car in an orientation corresponding to the computation result at those coordinates. Note that a physical computation corresponding to locating as described above may cause a drop from a particular position of locating coordinates, for example, perform a collision computation in accordance with a collision of a street, and be terminated when the orientation reaches a converged state (a steady state), and the NPC car is fixedly located in the target scene as a static BG object in this state.

The processing of step S405 and step S406 is repeated until all of the non-moving NPC cars to be located are located in the target scene.

In step S407, the control unit 101 determines the number of NPC cars that move to locate in the target scene, movement courses, and movement start coordinates based on surplus computation resources, and sequentially determines the types to locate from the load target types in accordance with information of appearance frequency for each type which is determined for information for locating NPC cars. In the game content of the present embodiment, because whether or not to control a behavior of an NPC car based on a physical computation in accordance with a distance from the PC is switched as described above, the control unit 101 determines the number to locate, movement courses, and movement start coordinates in order to be able to implement a number of NPC cars for which parallel physical computation is possible in surplus computation resources. The movement courses may determined to run along a route of a road between locations that are predetermined, for example, and the movement start coordinates may be determined based on a point determined on that movement course and a direction of forward movement. Also, in this step, the control unit 101 selects NPCs corresponding to a condition (omitted in the example of FIG. 5) indicated in information for locating an NPC car from NPCs that are not scenelocated in the current display as NPCs that are caused to ride in the NPC cars of the determined types.

In step S408, the control unit 101 sets a material parameter of NPC cars of the types determined in step S407, and locates in the target scene. Specifically, the control unit 101 sets a value or application level of various parameters of an NPC car that is located in range determined for information for locating an NPC car for each material of the determined type, and stores in the memory 103 in association with an NPC caused to ride therein. Also, the control unit 101 calculates a distance between movement start coordinates and position coordinates of the PC, and determines whether or not to perform locating based on a physical computation based on that distance. The control unit 101 performs a physical computation corresponding to terrain of world coordinates (movement start coordinates) that are located when locating the an NPC car of the determined type together with an NPC in the target scene if the calculated distance falls below a distance at which it is predetermined that the physical computation is performed. Then, the control unit 101 locates an NPC car at those coordinates in an orientation corresponding to the computation result, and registers that NPC car in a computation target list in the memory 103, for example, as a target for performance of behavior control according to a physical computation. Also, the control unit 101 locates an NPC car of the determined type together with an NPC at the movement start coordinates, and registers it in a route movement target list in the memory 103, for example, as a target of performance of control of movement following route information determined for a road which is a movement course if the calculated distance is greater than or equal to a predetermined distance.

The processing of step S407 and step S408 is repeated until all of the moving NPC cars are located in the target scene. Note that an NPC car registered in the computation target list is controlled so as to be removed from the computation target list, and registered in the route movement target list if a distance between coordinates after the movement due to a movement accompanying a physical computation following a route thereafter and position coordinates of the PC are greater than or equal to a predetermined distance. Also, conversely, an NPC car registered in the route movement target list is controlled so as to be removed from the route movement target list, and registered in the computation target list if a distance between coordinates after a movement according to a movement following a route thereafter and position coordinates of the PC falls below a predetermined distance.

With such a configuration, it is possible to express an NPC car with only locating and an NPC car for which locating and behavior control are necessary with surplus hardware resources so as to present various outer appearances.

Note that explanation was given having the NPC car locating processing of the present embodiment be something in which the control unit 101 determines a material parameter in a value range determined for information for locating an NPC car, but configuration may be taken such that a plurality of types of combinations of parameter values of each material are determined by the designer for information for locating an NPC car so not to end up with an unnatural outer appearance by a numerical value being selected randomly. In such a case, the control unit 101 may set as a material parameter a combination of values selected from those combinations. Also, it is not necessarily necessary that information for locating an NPC car be determined in accordance with an area, the weather, or a time period; configuration may be taken such that it is determined for at least one of these, and configuration may be taken such that such that it is determined including other conditions.

Also, in the present embodiment, while explanation was given having a material parameter for generating an NPC car be something that includes a rust, a faded color, a paint peeling, or an unevenness as a damage state in addition to a reference color, implementation of the present invention is not limited to this, and configuration may be taken such that it is possible to set at least one of a reference color, a degree of damage, a degree of degradation, and a degree of deformation in order to present a different outer appearance of an NPC car, for example. Also, implementation of the present invention as described above is not something that is limited to automobiles; this may be applied for various rendering objects that configure an outer appearance by applying a texture. Accordingly, various materials for which determination for the outer appearance of a target rendering object is possible may be the target of setting for a material parameter as well.

Also, explanation for a usage amount of a hardware resource for essential objects and priority objects is omitted, but it goes without saying that an LOD (Level of Detail) technique, a change in a tessellation level, or the like may be performed to reduce the rendering load with respect to distant rendering objects.

Also, because an amount of surplus hardware resources may change successively in accordance with manipulation performed by a player, the control unit 101 may monitor or predict a usage amount, for example, and perform a deletion of an NPC car that is a control target or a limitation on a type as necessary. Also, for an NPC car that for which behavior control is performed based on a physical computation, movement can be stopped due to a PC, or the like, that enters onto a traffic lane which driven on, but it is not necessary for the control unit 101 to cause the control to be such that data corresponding to that NPC car is released or removed from the computation target list even if a time period in which a type of that NPC car is determined to appear is exceeded. That is, because causing the NPC car to disappear in a situation in which it may be focused on when its distance from the PC is small causes a destruction of reality, in such a case the locating of that NPC car may be maintained, and a data release may be performed in a situation in which thereafter movement occurs and the distance from the PC becomes greater than or equal to a predetermined distance, and also a direction of a viewpoint for which it is determined that there will not be a focus by a player is selected.

As explained above, it is possible for the information processing apparatus of the present embodiment to control and suitably generate rendering objects that present reality under a hardware restriction. For example, as one embodiment, the information processing apparatus determines, based on a first usage amount of a hardware resource allocated for processing corresponding to objects of a first category including an essential object located in a target scene, a second usage amount of a hardware resource that can be allocated for processing for objects of a second category different to the first category. Also, the information processing apparatus, for objects of the second category which are located in the target scene, determines, based on information for determining outer appearances for when the objects of the second category are located in the target scene and the second usage amount, types of those objects and an outer appearance parameter for each type.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Also, the information processing apparatus and the control method of the information processing apparatus according to the present invention are realizable by a program executing the methods on one or more computers. The program is providable/distributable by being stored on a computer-readable storage medium or through an electronic communication line.

This application claims the benefit of Japanese Patent Application No. 2015-052749, filed Mar. 16, 2015, which is hereby incorporated by reference herein in its entirety.

What is claimed is:

1. A non-transitory computer-readable storage medium storing a program that causes a computer, having a hardware resource used for one of computation and holding data connected to a renderer for rendering a screen in which an object is located in a scene, to execute:
  identifying a first usage amount of the hardware resource which is allocated for processing corresponding to objects of a first category including an essential object located in a target scene;
  determining, based on the first usage amount, a second usage amount of the hardware resource that is able to be allocated for processing for objects of a second category different than the first category; and
  deciding, for the objects of the second category which are located in the target scene, types of the objects and an outer appearance parameter for each of the types based on the second usage amount and information for deciding outer appearances for when the objects of the second category are located in the target scene,
  wherein a first type of the types of the objects of the second category which are located in the target scene is controlled in accordance with dynamic behavior control, and
  a second type of the types of the objects of the second category which are located in the target scene is controlled without the dynamic behavior control.

2. The non-transitory computer-readable storage medium according to claim 1, wherein the types of the objects of the second category correspond to different object models.

3. The non-transitory computer-readable storage medium according to claim 1, wherein the outer appearance parameter of at least one of the types of the objects changes a material attribute of a texture that is preset.

4. The non-transitory computer-readable storage medium according to claim 3, wherein the material attribute includes at least one of a reference color of a material, a degree of damage, a degree of degradation, and a degree of deformation.

5. The non-transitory computer-readable storage medium according to claim 3, wherein the material attribute is configured such that an application level is changeable in accordance with the outer appearance parameter for at least one region of the texture.

6. The non-transitory computer-readable storage medium according to claim 1, wherein the information for deciding the outer appearances presets the types of the objects of the second category which are located in the target scene, and the outer appearance parameter for each of the types corresponds to at least one of a position in a world, a time period, and weather of the target scene, and
  in the deciding, types of a number which corresponds to the second usage amount from the types of the objects of the second category set by the information for deciding the outer appearances for the target scene are selected as the types of the objects of the second category which are located in the target scene.

7. The non-transitory computer-readable storage medium according to claim 1, wherein, in the deciding, a plurality of outer appearance parameters that differ with respect to one type of the objects of the second category which are located in the target scene is decided, and
  the program further causes the computer to execute:
    successively causing the renderer to render each of the objects of the second category which are located in the target scene, that are decided in the deciding, based on the outer appearance parameter of each of the objects.

8. The non-transitory computer-readable storage medium according to claim 1, wherein the program further causes the computer to execute:
  managing the objects which are located in the target scene as control targets in response to a dynamic change, and
  in the managing, the objects of the second category are managed as the control targets when the objects are located in the target scene, and the objects are excluded from the control targets after locating the objects.

9. The non-transitory computer-readable storage medium according to claim 1, wherein the program further causes the computer to execute:
  controlling a behavior of the objects which are located in the target scene, and
  in the controlling, for the target scene, the behavior of the objects of the second category which are located in the target scene, which are located less than a predetermined distance from a predetermined object among the objects of the first category, is controlled by a method that handles a dynamic change, and the behavior of the objects of the second category which are located in the target scene, which are located greater than or equal to the predetermined distance from the predetermined object, is controlled by a method that does not handle the dynamic change.

10. The non-transitory computer-readable storage medium according to claim 9, wherein the method that handles the dynamic change controls the behavior considering a determination of a collision with another object including a terrain, and
  the method that does not handle the dynamic change controls the behavior on a predetermined path without considering the determination of the collision with the other object.

11. The non-transitory computer-readable storage medium according to claim 1, wherein the information for deciding the outer appearances presets objects of a third category, which are different from the objects of the first category and the second category and which are not given fixed-roles,
  each of the objects of the third category is caused to be associated with one of the objects of the second category depending on a type and an outer appearance parameter or a type of the one of the objects of the second category, and
  in the determining, the objects of the third category are included as the outer appearance parameter of the one of the objects of the second category which is located in the target scene.

12. An information processing apparatus having a hardware resource used for one of computation and holding data connected to a renderer for rendering a screen in which an object is located in a scene, the information processing apparatus comprising:
  a processor; and a memory including instructions that, when executed by the processor, cause the processor to perform operations including:

identifying a first usage amount of the hardware resource which is allocated for processing corresponding to objects of a first category including an essential object located in a target scene;

determining, based on the first usage amount identified by the identifier, a second usage amount of the hardware resource that is able to be allocated for processing for objects of a second category different than the first category; and deciding, for the objects of the second category which are located in the target scene, types of the objects and an outer appearance parameter for each of the types based on the second usage amount and information for deciding outer appearances for when the objects of the second category are located in the target scene, wherein a first type of the types of the objects of the second category which are located in the target scene is controlled in accordance with dynamic behavior control, and a second type of the types of the objects of the second category which are located in the target scene is controlled without the dynamic behavior control.

13. A method of controlling an information processing apparatus having a hardware resource used for one of computation and holding data connected to a renderer for rendering a screen in which an object is located in a scene, the method comprising:

identifying, by a processor, a first usage amount of the hardware resource which is allocated for processing corresponding to objects of a first category including an essential object located in a target scene;

determining, by the processor and based on the first usage amount, a second usage amount of the hardware resource that is able to be allocated for processing for objects of a second category different than the first category; and deciding, by the processor and for the objects of the second category which are located in the target scene, types of the objects and an outer appearance parameter for each of the types based on the second usage amount and information for deciding outer appearances for when the objects of the second category are located in the target scene, wherein a first type of the types of the objects of the second category which are located in the target scene is controlled in accordance with dynamic behavior control, and a second type of the types of the objects of the second category which are located in the target scene is controlled without the dynamic behavior control.

14. The non-transitory computer-readable storage medium according to claim 1, wherein the types of the objects of the second category which are located in the target scene are decided based on a distance in the target scene from the essential object.

15. The non-transitory computer-readable storage medium according to claim 14, wherein objects of the first type are decided to be closer to the essential object than objects of the second type.

16. The non-transitory computer-readable storage medium according to claim 15, wherein the program further causes the computer to execute:

reclassifying one of the objects of the second category which is located in the target scene and decided to be the first type as the second type when a distance of the one of the objects changes to exceed a predetermined distance.

17. The non-transitory computer-readable storage medium according to claim 16, wherein the one of the objects which is reclassified from the first type to the second type transitions from being controlled with the dynamic behavior control to being controlled without the dynamic behavior control, and the transition is based on a movement speed of the one of the objects in the target scene.

18. The non-transitory computer-readable storage medium according to claim 1, wherein, for at least one of the objects of the second category which is located in the target scene and decided to be the first type of the types of the objects, an effect of the at least one of the objects is decided to be the second type of the types of the objects.

19. The non-transitory computer-readable storage medium according to claim 1, wherein the deciding is performed at predetermined time intervals in parallel with processing for rendering a game screen.

\* \* \* \* \*